United States Patent [19]

Newman

[11] Patent Number: 4,936,103
[45] Date of Patent: Jun. 26, 1990

[54] APPARATUS AND METHOD FOR CONTROLLING FOOD TEMPERATURE DURING TRANSPORTING

[76] Inventor: Merle E. Newman, 6897 Second Ave., Des Moines, Iowa 50313

[21] Appl. No.: 371,607

[22] Filed: Jun. 26, 1989

[51] Int. Cl.[5] .......................... F25D 17/08; F25D 3/08
[52] U.S. Cl. .......................................... 62/89; 62/244; 62/457.2; 62/457.7; 211/186
[58] Field of Search ..................... 62/244, 457.7, 457.2, 62/457.1, 89; 220/4 F; 211/186

[56] References Cited

U.S. PATENT DOCUMENTS

| | | | |
|---|---|---|---|
| 2,902,838 | 9/1959 | Nichols | 62/244 |
| 3,043,116 | 7/1962 | Fuller | 62/244 |
| 3,164,971 | 1/1965 | Gentz | 62/244 X |
| 3,916,639 | 11/1975 | Atkinson | 62/244 X |
| 4,103,510 | 8/1978 | Hall | 62/457.2 X |
| 4,478,052 | 10/1984 | McDowell | 62/244 |
| 4,577,772 | 3/1986 | Bigliardi | 220/4 F X |
| 4,653,289 | 3/1987 | Hodgette | 62/244 X |
| 4,665,838 | 5/1987 | Minshall | 211/186 X |
| 4,779,923 | 10/1988 | Lang et al. | 62/244 X |
| 4,823,554 | 4/1989 | Trachtenberg et al. | 62/244 X |

FOREIGN PATENT DOCUMENTS 458173  7/1949  Canada .................................. 62/244

Primary Examiner—William E. Tapoical
Attorney, Agent, or Firm—Zarley, McKee, Thomte, Voorhees & Sease

[57] ABSTRACT

The present invention utilizes the combination of a vehicle having a passenger compartment, a heating and cooling air-conditioning system, and an air vent opening for providing conditioned air to the passenger compartment. Within the storage compartment of the vehicle, a food container is placed which has an air conduit connected thereto. The air conduit is also connected to the air vent opening on the dash of the vehicle so that conditioned air is directed to the internal food compartment of the food container. A fan may be provided within the conduit for facilitating the movement of air from the air-conditioning vent of the vehicle into the food compartment of the container. A modified form of the invention utilizes collapsible container walls and collapsible shelves within the container.

13 Claims, 2 Drawing Sheets

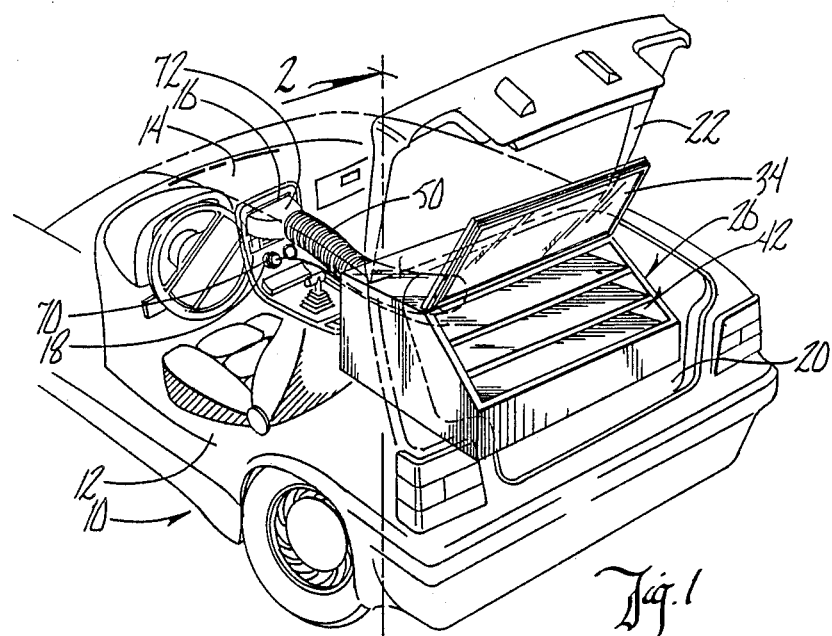
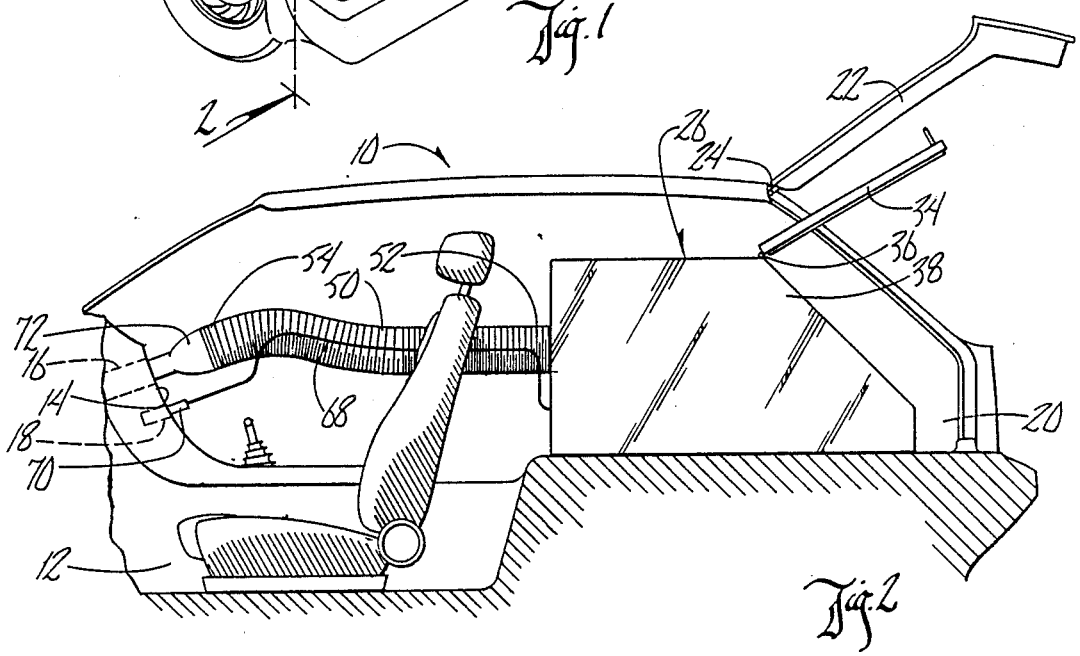
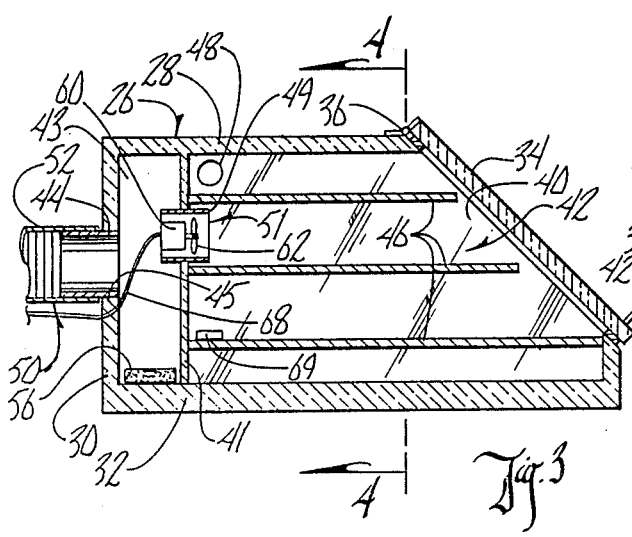
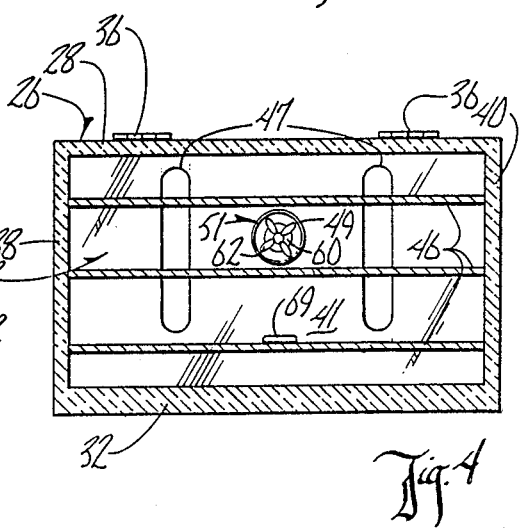

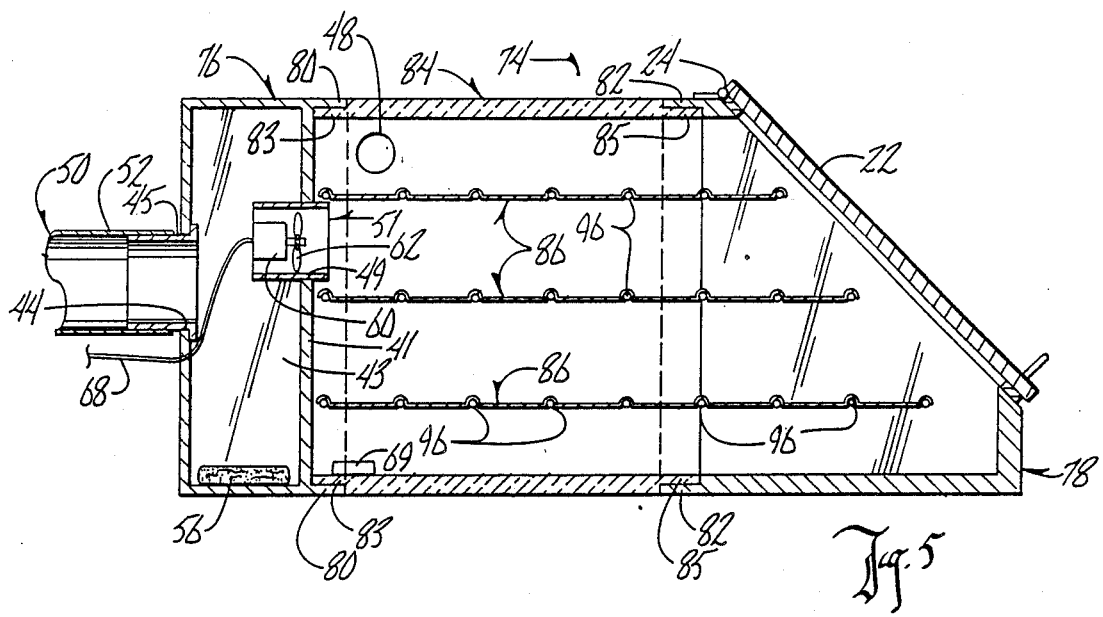
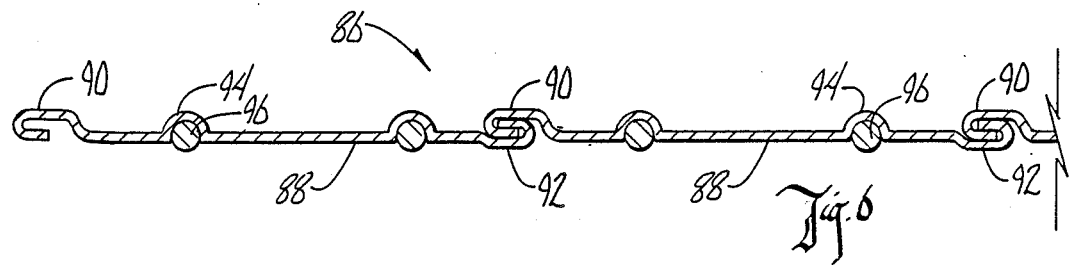

APPARATUS AND METHOD FOR CONTROLLING FOOD TEMPERATURE DURING TRANSPORTING

BACKGROUND OF THE INVENTION

This invention relates to an apparatus and method for controlling food temperature during the transporting of food.

Delivery of ready-to-eat food involves several problems in keeping the food fresh and at the right temperature. Many foods are transported in this manner such as pizza, sandwiches (both hot and cold), pies, and other types of food.

During transporting, it is desirable to keep these ready-to-eat foods at the desired temperatures. Some types of food are required to be kept at higher temperatures, whereas other types of food are required to be kept cold.

Another problem encountered with the transporting of food is the maintaining of the food in a fresh condition. Many types of insulated storage containers permit the food to become damp or wilted. This is particularly a problem with such foods as sandwiches which require proper ventilation in order to prevent them from becoming soggy during transporting.

Custom-designed vehicles are presently provided for transporting ready-to-eat foods of this type. However, these custom-designed vehicles are very expensive and must be specially purchased for the delivery of ready-to-eat foods. There is a need for an apparatus and method which will permit the adaptation of a conventional vehicle so that it can be utilized for transporting food, while at the same time maintaining the food in a fresh condition at the proper temperature.

Therefore, a primary object of the present invention is the provision of an improved apparatus and method for controlling food temperature during the transporting of the food.

A further object of the present invention is the provision of a device which can be inexpensively adapted to conventional vehicles for providing either heating or cooling of the food.

A further object of the present invention is the provision of a device which provides desirable ventilation so as to minimize the chances that the food will become soggy or wilted.

A further object of the present invention is the provision of a device which can be easily stored in the back of a conventional vehicle and which can be quickly and easily connected to the air-conditioning and heating system of the vehicle for providing the temperature control.

A further object of the present invention is the provision of a device which is economical to manufacture, durable in use, and efficient in operation.

SUMMARY OF THE INVENTION

The present invention utilizes a food container which may be stored in the storage compartment or trunk of a vehicle. It is easily adapted for use with a hatchback vehicle which has a door at the back thereof. It can also be adapted for station wagons or other types of vehicles.

The food container has a conduit opening at its forward end, and an elongated flexible conduit is connected at one end to this conduit opening of the food container. The other end of the conduit extends forwardly and is connected to the air-conditioning outlet on the dashboard of the vehicle. The air-conditioning system of the vehicle can then be used to provide temperature-controlled air to the food container. The temperature controls on the vehicle can be used either to provide heat or cooling to the food container. The air-conditioning systems of most vehicles include means for at least partially dehumidifying the air before it is delivered through the air-conditioning vent. Thus, the air provided to the food container is not only of the desired temperature, but it also has much of the moisture removed therefrom.

A small frontal compartment is provided at the front off the larger food compartment. Cooling or heating aids such as dry ice or preheated water can be provided in the frontal compartment.

If needed, a fan can be used to provide further drawing of the air from the conditioning system of the vehicle into the food compartment of the food container. The fan may be an electrical fan having a cord with a plug adapted to fit within the cigarette lighter of the vehicle so as to provide power to the fan. An exhaust hole is provided preferably at the upper portion of the food container so as to provide means for the air to exit from the container during ventilation.

A modified form of the invention includes a container having collapsible side walls and collapsible shelves. These collapsible features add to the safety of the device in the event of an automobile accident.

BRIEF DESCRIPTION OF THE DRAWINGS

FIG. 1 is a perspective view of a vehicle showing portions cut away and showing the apparatus of the present invention therein.

FIG. 2 is a sectional view taken along Line 2—2 of FIG. 1.

FIG. 3 is a vertical sectional view through the food container of the present invention.

FIG. 4 is a sectional view taken along Line 4—4 of FIG. 3.

FIG. 5 is a view similar to FIG. 3, but showing a modified form of the invention.

FIG. 6 is an enlarged sectional view of one of the collapsible shelves in FIG. 5.

DESCRIPTION OF THE PREFERRED EMBODIMENT

Referring to the drawings, the numeral 10 generally designates the vehicle used in combination with the present invention. Vehicle 10 includes a passenger compartment 12, having a dashboard 14 and a heating and air-conditioning vent 16 therein.

Also provided on the dashboard is a cigarette lighter outlet 18 conventionally found in most vehicles. The vehicle includes a rear storage compartment 20 having a storage compartment door 22. The present invention is adaptable for use with various types of vehicles, including station wagons, vehicles with hatchbacks, or vehicles with conventional trunks. Storage compartment door 22 is hinged about hinges 24 (FIG. 2).

Within storage compartment 20 is a food container 26 having an insulated housing comprising a top wall 28, a front wall 30, a bottom wall 32, and a container door 34. Door 34 is hinged about hinges 36. Front wall 30 includes conduit opening 44 having a cylindrical collar 45 therein. Food container 26 also includes side walls 38, 40, and a partition 41. Formed within food container 26 is a food compartment 42 and a frontal compartment 43 formed on opposite sides of partition 41. A plurality of shelves 46 are provided for storing the food within the compartment 42. At the upper end of side wall 40 is an exhaust opening 48. Partition 41 includes a pair of elongated slots 47 formed therein and also has a fan housing 49 containing a fan 51 therein.

Connected over collar 45 of conduit opening 44 is the first end 52 of an air conduit 50. Air conduit 50 also includes a second end 54.

Fan 51 also includes a fan motor 60 and a fan blade 62. Fan 51 is not necessary in all applications of the present invention, but it does facilitate the drawing of air through the conduit, the frontal chamber 43, and into the food compartment 42. Cooling aids such as dry ice 56 can be stored in frontal chamber 43 to further cool the air passing therethrough. Alternatively, heating aids such as a hot water container (not shown) can be used to heat the air when desired.

Extending from motor 60 is a motor cord 68 having a plug 70 on the end thereof which is adapted to matingly fit within the cigarette outlet of a conventional vehicle. This provides electrical power to the motor for driving the motor. A thermostat 69 may also be provided for turning fan motor 60 on or off in response to temperature changes within the container.

Connected to the forward end 54 of the air conduit 50 is a bracket 72 which is adapted to join the air conduit 50 to the air-condition vent 16.

In operation, the device can be quickly and easily inserted into a conventional vehicle. The conduit 50 is connected to the food container 26 and the forward end of the conduit is attached to the air-condition vent 16 opening. If a fan is used, the fan cord 68 is plugged into the cigarette outlet on the dash of the vehicle. The food container 26 may be filled by opening vehicle door 22 and then opening container door 34, thereby providing access to the interior compartment 42 from the rear of the vehicle. The sandwiches or other food may be placed on the shelves 46 within the container, and the doors 34 and 22 are then closed.

When the operator starts the engine of the vehicle, the air-conditioning system is turned on and the operator can control whether hot air or cool air is introduced to the container 26. Control may be provided by utilizing the air-conditioning controls on the vehicle itself. The air is directed through conduit 50 and into the compartment 42 where it passes around the various shelves 46, thereby removing excess humidity and providing the desired temperature within the container 26. The air is cooled further by the dry ice 56 within compartment 43.

Referring to FIGS. 5 and 6, a modified form of the invention is shown and is designated by the numeral 74. Device 74 is similar to the device shown in FIGS. 1-4, but differs in that it employs collapsible walls and shelves. Corresponding parts in the device of FIG. 5 are given the same numerals as identical parts in the device shown in FIGS. 1-4. Device 74 includes a front container housing, 76 and a rear container housing 78, each of which include rearwardly and forwardly extending annular flanges 80, 82 respectively.

Extending between flanges 80, 82 is a rectangular intermediary housing 84 which is rectangular in cross-section and which is comprised of a collapsible material such as Styrofoam. The front and rear edges of the Styrofoam intermediary housing 84 include lip flanges 83, 85 respectively, which protrude within and snugly fit within the flanges 80, 82 of the front and rear housings 76, 78.

The advantage of the above construction is safety in the event of an automobile accident, particularly a rear end collision. The collapsible walls of the intermediary section 84 will crumble and collapse, thereby minimizing the tendency of the entire container 74 to be driven forwardly, possibly resulting in injury to the driver of the vehicle.

A further collapsible feature is provided by the collapsible shelves 86, shown in FIGS. 4 and 5. Each collapsible shelf is formed from a plurality of plastic sections 88 shown in detail in FIG. 6. Each section 88 includes in cross-section a downwardly extending, J-shaped member at its forward edge, and an upwardly J-shaped member 92 at its rear edge. J-shaped members 80, 82 are adapted to be hooked together as shown in FIG. 6 so as to provide a continuous shelf from each of the sections 88.

Each section 88 also includes two arcuate ribs 94 which can be used to support elongated dowels 96 extending between the side walls of intermediary frame 84.

In the event of a rear end collision, the shelves 86 will collapse into their component sections 88, thereby further minimizing the chance of an elongated shelf being driven into the operator of the vehicle.

Thus, it can be seen that the device accomplishes at least all of its stated objectives.

I claim:

1. In combination:
   a vehicle having a passenger compartment and a heating and cooling air-conditioning system, said heating and cooling air-conditioning system having an air vent opening in communication with said passenger compartment for providing conditioned air to said passenger compartment;
   said vehicle having a storage compartment;
   a food container comprising an outer housing and a partition dividing said container into a frontal compartment and a food compartment, an access door in said outer housing and being movable from a closed position enclosing said food compartment to an open position providing access to said food compartment for inserting food into and removing food from said food compartment;
   a plurality of food items within said food compartment;
   a conduit opening within said outer housing providing communication between the exterior of said housing and the interior of said frontal compartment;
   an elongated flexible conduit having a first end attached to said conduit opening of an outer housing and having a second end attached to said air vent opening of said vehicle for delivering said conditioned air from said air vent opening to said frontal compartment;
   a fan housing attached to said partition and providing a fan opening for providing air communication between said frontal compartment and said food compartment;
   fan means within said fan housing for impelling air from said frontal compartment to said food compartment;
   heat transfer means within said frontal compartment for altering the temperature of said conditioning air passing from said conduit through said frontal chamber to said food chamber.

2. A combination according to claim 1 wherein said fan means comprises a fan blade and an electric motor for driving said fan blade, said motor having an electric cable extending therefrom with a plug on the distal end thereof, said plug being adapted to matingly fit within a cigarette lighter outlet, said vehicle having a cigarette lighter outlet receiving said plug for providing electrical power to said electric motor.

3. A combination according to claim 3 wherein said housing includes an exhaust opening therein for permitting a limited amount of air to exhaust from said food compartment.

4. A combination according to claim 3 wherein said food compartment includes a plurality of shelves therein for supporting food therein.

5. A combination according to claim 4 wherein said vehicle includes a rear door for providing access to said storage compartment, said access door of said housing being positioned adjacent said rear door of said vehicle whereby access to said food compartment can be achieved from outside said vehicle by first opening said rear door of said vehicle and then opening said access door of said housing.

6. A device according to claim 1 wherein said container housing includes sidewalls which are collapsible in response to impact from an automobile collision so as to cause said container housing to collapse.

7. A device according to claim 6 wherein said food compartment includes a plurality of horizontal shelves therein, each of said shelves being formed of a plurality of shelve sections detachably joined to one another.

8. A device according to claim 7 wherein said shelf sections are adapted to become detached from one another in response to the impact from an automobile accident whereby said horizontal shelves will collapse.

9. A method for controlling the temperature of food during transport comprising:
placing a food container within a storage compartment of a vehicle, said food container having a housing forming a frontal compartment and a food compartment therein, said frontal and food compartments being separated by a partition, said housing having a conduit opening providing communication from the exterior to the interior of said frontal compartment said partition having a fan opening therein providing communication between said frontal and food compartments;
placing said food within said food compartment;
connecting a first end of an air conduit to said conduit opening;
connecting a second end of said air conduit to an air vent of a heating and cooling air-conditioning system for said vehicle;
using said air-conditioning system to provide conditioned air at a predetermined temperature through said air conduit into said frontal compartment; and
impelling said conditioned air from said frontal compartment into said food compartment by means of a fan mounted in said fan opening of said partition, said fan having a plug matingly fitted within a cigarette lighter outlet of said vehicle; and
using heat transfer means within said frontal compartment to change the temperature of said air as said air passes through said frontal compartment into said food compartment.

10. In combination:
a vehicle having a passenger compartment and a heating and cooling air-conditioning system, said heating and cooling air-conditioning system having an air vent opening in communication with said passenger compartment for providing conditioned air to said passenger compartment;
said vehicle having a storage compartment;
a food container comprising a front housing, a rear housing and an intermediary housing extending between said front and rear housings to form an enclosed food compartment;
an access door being provided in one of said front, intermediary, and rear housings for providing access into said food chamber;
a plurality of food items within said food compartment;
a conduit opening within one of said front, rear, and intermediary housings and providing communication between the exterior of said container and the interior of said food compartment;
an elongated flexible conduit having a first end attached to said conduit opening and having a second end attached to said air vent for delivering said conditioned air from said air vent opening to said food compartment;
said intermediary housing being made of a collapsible material which is adapted to fail structurally and collapse in response to compressive forces of predetermined magnitude between said front and rear housings, said predetermined magnitude being substantially less than the magnitude of compressive force required to cause said front and rear housings to fail structurally.

11. A combination according to claim 10 wherein said collapsible material of said intermediary housing is a foamed plastic.

12. A combination according to claim 10 wherein at least one shelf assembly is mounted within said food compartment, said shelf assembly comprising at least a first shelf segment and a second shelf segment, each of which includes a forward edge and a rear edge; coupling means detachably connecting said forward edge of said first shelf segment to said rear edge of said second shelf segment; said coupling means being adapted to release said connection of said front and rear shelf segments in response to compressive forces between said forward edge of said second shelf and said rear edge of said first shelf.

13. A combination according to claim 12 wherein said coupling means comprise first and second complimentary J-shaped members on said front and rear edges of said first and second shelf members, said J-shaped members being interlocked so as to prevent said first and second shelf segments from moving away from one another and so as to permit said first and second shelf segments to move toward one another.

* * * * *